United States Patent [19]
Mitchell et al.

[11] Patent Number: 5,454,707
[45] Date of Patent: Oct. 3, 1995

[54] NON-SCUFFING, NON-STICKING BLOW CORE FOR STRETCH BLOW MOLDING MACHINES

[75] Inventors: Paul W. Mitchell, Blue Springs; Paul A. Stamper, Lee's Summit, both of Mo.

[73] Assignee: R & D Tool And Engineering, Inc., Lee's Summit, Mo.

[21] Appl. No.: 160,414

[22] Filed: Dec. 1, 1993

[51] Int. Cl.⁶ ................................................ B29C 49/12
[52] U.S. Cl. .................. 425/524; 264/549; 264/550; 425/529; 425/536
[58] Field of Search ................................ 425/524, 529, 425/530, 535, 536; 264/549, 550, 551

[56] References Cited

U.S. PATENT DOCUMENTS

| | | |
|---|---|---|
| 2,157,983 | 5/1939 | Glougie . |
| 3,331,610 | 7/1967 | Olson . |
| 3,342,914 | 9/1967 | Edwards ................................ 264/551 |
| 3,947,205 | 3/1976 | Edwards ................................ 425/529 |
| 3,993,427 | 11/1976 | Kauffman et al. . |
| 4,244,913 | 1/1981 | Ryder . |
| 4,362,304 | 12/1982 | Hunger . |
| 4,790,741 | 12/1988 | Takakusaki et al. . |

*Primary Examiner*—Tim Heitbrink
*Attorney, Agent, or Firm*—Hovey, Williams, Timmons & Collins

[57] ABSTRACT

The tip of the blow core on a stretch blow molding machine is slightly smaller in diameter than the neck of the preform into which it is inserted such that during both insertion and withdrawal there is no physical contact between the core and the preform. However, when the core tip is in place within the preform and the blow surge commences, a resilient sealing ring around the core tip expands into radial contacting engagement with the preform to seal off what would otherwise be an air escape route. When the air surge terminates, the ring contracts into a dove tail gland around the core tip so as to be substantially flush with the surface of the tip, permitting the core to be withdrawn without contacting the preform.

19 Claims, 2 Drawing Sheets

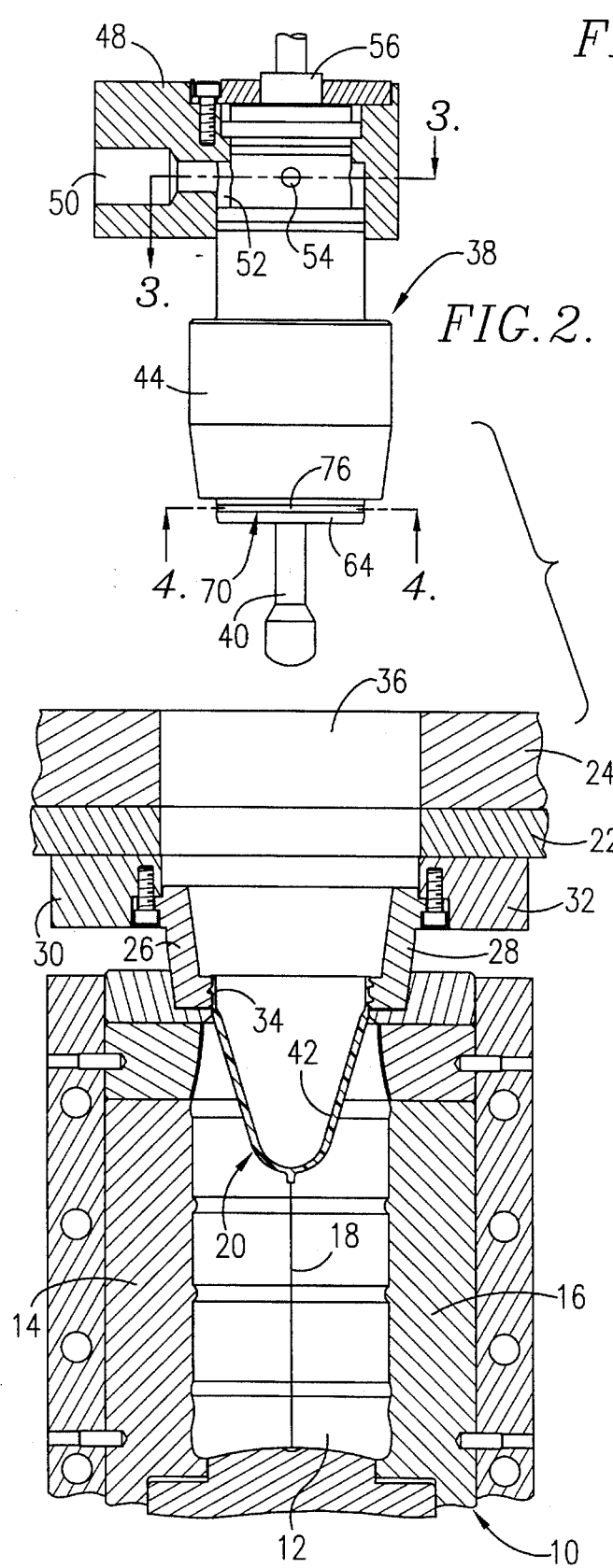
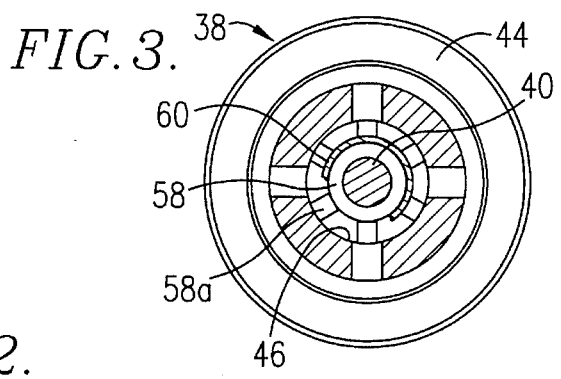
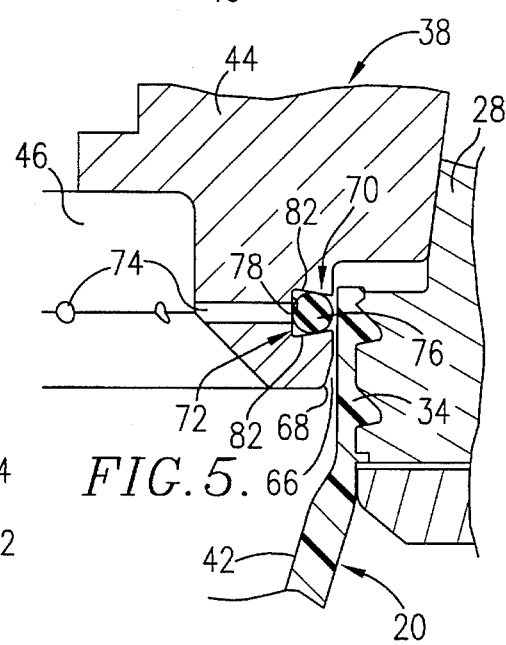
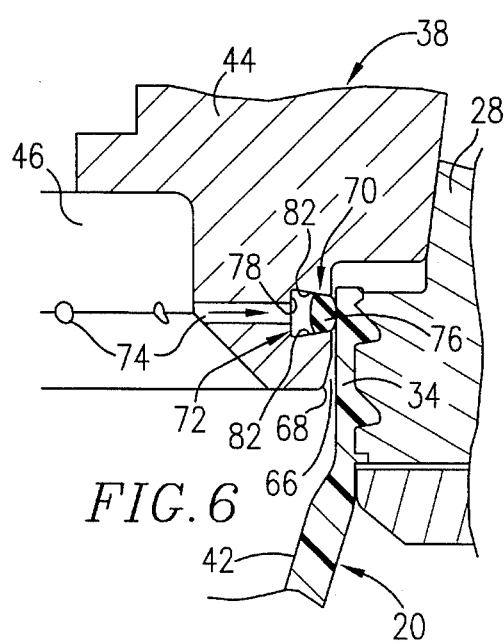

NON-SCUFFING, NON-STICKING BLOW CORE FOR STRETCH BLOW MOLDING MACHINES

TECHNICAL FIELD

The present invention relates to the field of stretch blow molding machines and, more particularly, to improvements in the construction of the blow core of such machines to accomplish an effective air-tight, positive seal between the core and the surrounding neck of an expandable preform during the surge of high pressure air that accompanies the blow molding process, while avoiding damage to the neck of the preform during insertion and withdrawal of the core from the preform.

BACKGROUND

Conventional stretch blow molding machines have an elongated blow core that is inserted a short distance into the open mouth of a preform at the blow station for the purpose of then injecting a surge of high pressure air into the warmed and softened body of the preform to stretch it quickly into the recesses of the mold cavity. A stretch rod normally associated with the core also moves through a quick stretching stroke to mechanically engage and stretch the body of the preform in cooperation with the air charge during the blow cycle. The blow core and stretch rod are then withdrawn and the finished product is removed from the blow station.

It is important to have a tight seal between the exterior of the blow core and the surrounding neck of the preform during the blow cycle, or else untoward air leakage will occur around the core as the high pressure air is injected. Leakage not only produces significant inefficiencies, but also may result in inadequate and incomplete stretching of all regions of the preform into some of the more distant and intricate recesses of the blow cavity.

Consequently, one conventional practice is to make the outer diameter of the blow core substantially the same size as the inner diameter of the preform neck. While this is helpful insofar as the leakage problem is concerned, it also increases the risk that the core will abrade or tear the inside surface of the neck during either insertion or withdrawal of the core. This can cause unsightly scuffing, marring, tearing, shearing or stress cracking of the neck, all of which is highly undesirable.

Another approach is to make the blow core slightly oversized relative to the neck. The tight fit which results is effective in preventing leakage, but in some instances the fit has been so tight that the core sticks in the neck and the machine is not powerful enough to raise the core up out of the preform when the blow cycle is finished.

One effort to solve the problem has been through the use of one or more sealing O-rings around the core, which is otherwise slightly undersized relative to the neck. However, the repeated abrading action of the O-ring against the neck surface during insertion and removal of the core may cause shards and slivers of the O-ring to fall into the container, which is also highly undesirable.

SUMMARY OF THE DISCLOSURE

Accordingly, one important object of the present invention is to provide an improved way of establishing an effective, positive seal around the blow core during the blow cycle without the disadvantages and problems associated with the prior art approaches.

In this respect, the present invention involves making the working tip of the blow core slightly undersized with respect to the inside diameter of the neck of the preform. Thus, during insertion and removal of the core, there is ample clearance between the core and the neck to prevent significant contact. However, once the core is inside the neck, a resilient sealing ring around the tip of the core is expanded radially by air pressure into sealing engagement with the neck, thereby closing off what would otherwise be an escape route for air during the blow cycle. After the blow cycle is completed and pressurized air to the ring is discontinued, the ring contracts to disengage from the preform, and the core withdraws freely. The sealing ring is captured within a specially configured groove-like gland around the tip of the core so that the outer extremity of the ring is essentially flush with or below the outside diameter of the core prior to inflation and then bulges outwardly beyond the core once air pressure is applied to the gland behind the ring.

BRIEF DESCRIPTION OF THE DRAWINGS

FIG. 2 is a fragmentary, vertical cross-sectional view of the work station of FIG. 1 on a slightly reduced scale and showing the blow core in a withdrawn position;

FIG. 3 is an enlarged, horizontal cross-sectional view through the upper end of the blow core taken substantially along line 3—3 of FIG. 2;

FIG. 5 is a fragmentary, enlarged cross-sectional view of the working tip of the blow core in its blow position within the preform but just prior to introduction of the air surge; and FIG. 6 is a fragmentary, cross-sectional view of the core tip similar to FIG. 5, but illustrating the manner in which the sealing ring is expanded by air pressure during the blow stage up against the inside surface of the neck of the preform.

DETAILED DESCRIPTION

Figures 1, 4:
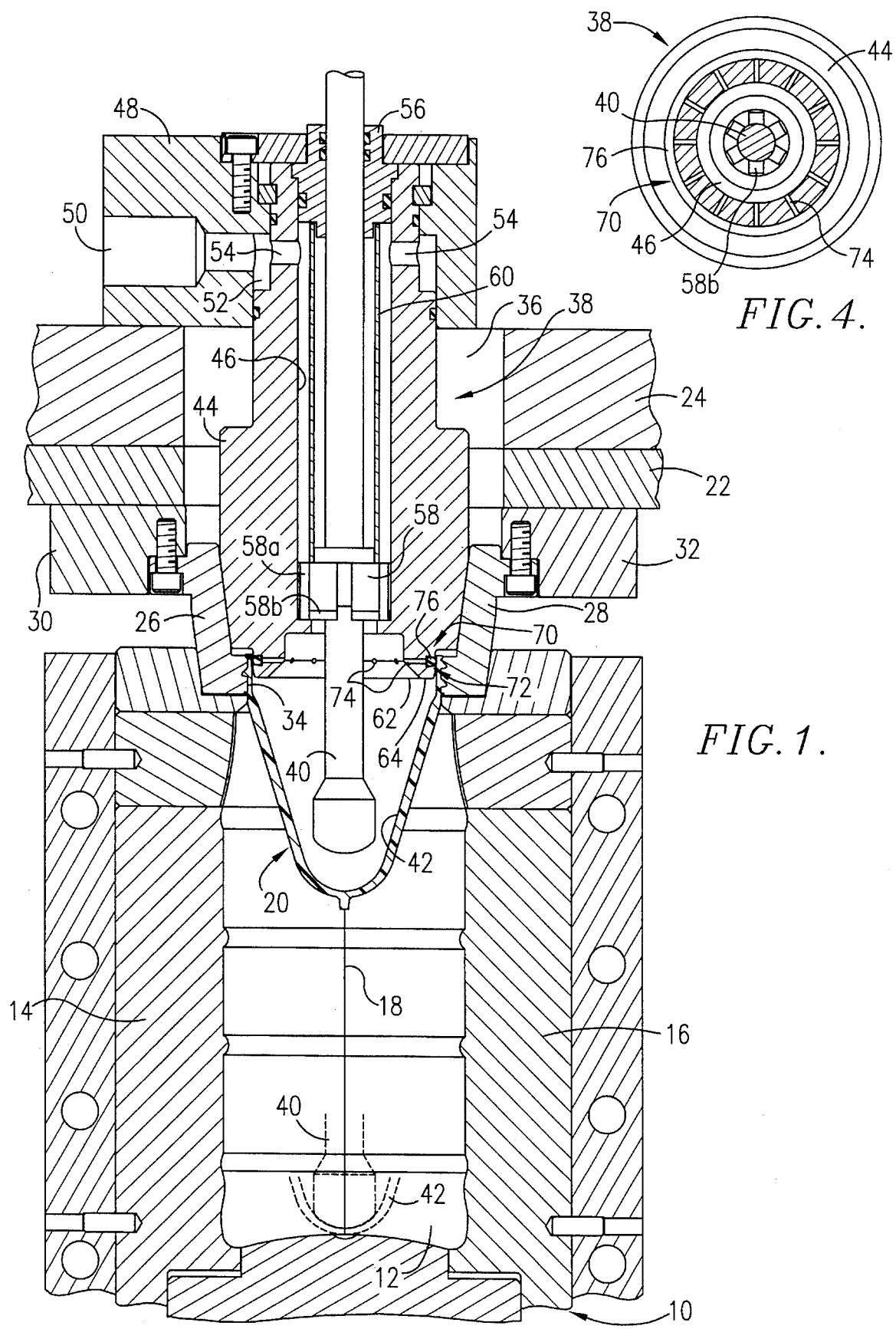
FIG. 1 is a fragmentary, vertical cross-sectional view of the blow station on a typical stretch blow molding machine with the blow core inserted into the preform just prior to introduction of an air surge to stretch the preform into the desired configuration.
FIG. 4 is an enlarged, horizontal cross-sectional view through the expandable sealing means of the present invention taken substantially along line 4—4 of FIG. 2.

The blow station in the illustrated embodiment includes a blow cavity broadly denoted by the numeral 10 and provided with an internal cavity 12 defined by a pair of cooperating cavity halves 14 and 16. The internal cavity 12 is configured to correspond to the external configuration desired for the blow molded product after completion of the blow stage. As well understood by those skilled in the art, the blow cavity halves 14 and 16 are movable toward and away from one another in a horizontal direction by means not illustrated so that when engaged together along the parting line 18 they define the internal cavity 12; when spaced apart, they define an open pathway for both discharging the finished product and introducing the next preform into proper position.

A heated preform 20 is carried to the blow station by suitable means such as a rotation plate 22 which, in the illustrated embodiment, rotates or indexes about an upright axis (not illustrated) relative to the stationary frame member 24 of the machine. As will be apparent, the preform 20 can be presented to the work station in any number of suitable ways, the rotation plate 22 being illustrated as but one example of such transport means. Furthermore, the present invention is equally usable in connection with both one-step and two-step machines, as will become apparent.

The rotation plate 22 carries with it a pair of opposed gripping jaws 26 and 28 or "thread splits" that are spring biased toward one another on slide members 30 and 32 carried by the rotation plate 22. The lower ends of the gripping jaws 26 and 28 are configured to complementally engage the threaded exterior of the annular neck 34 of the preform 20 for transporting the preform from station to station.

As shown perhaps most clearly in FIG. 2, the frame member 24, rotation plate 22, slide members 30, 32, and gripping jaws 26,28 are configured to cooperatively define an upright hole broadly denoted by the numeral 36 through which a blow core 38 can vertically reciprocate. In FIG. 2 the blow core 38 is illustrated in a withdrawn or retracted position, while in FIG. 1 the blow core 38 is shown in its lowered, blow position. As well understood by those skilled in the art, once the blow core 38 is in the blow position of FIG. 1, a reciprocable stretch rod 40 may be quickly actuated to its phantom line position to engage and stretch the receptacle portion 42 of the heated preform 20 to the lower limit of the blow cavity 12, at which time a charge of air is injected into the preform 20 from the core 38 so as to stretch the preform into and against all of the surrounding mold surfaces of the cavity 12. Thereafter, the cavity halves 14,16 are separated along the parting line 18, the core 38 is withdrawn, and the finished product is indexed to the ejection station by the rotation plate 22.

The blow core 38 includes a generally cylindrical, elongated body 44 having an axial bore 46 therethrough. The upper end of the body 44 is secured to and carried by a vertically reciprocal transport member 48 having a horizontal, pressurized air supply passage 50 communicating with the upper end of the bore 46 via an annular manifold 52 in the member 58 and a plurality of circumferentially spaced, radially extending inlet ports 54 in a reduced diameter upper end portion of the core body 44. The uppermost end of the bore 46 is closed by a bushing 56 that slidably guides the stretch rod 40 in its vertical extension and retraction strokes, there being a second bushing 58 for the rod 40 adjacent the lower end of the bore 46. An upstanding tube 60 of reduced diameter relative to the bore 46 surrounds the stretch rod 40 between the bushings 56, 58 so as to effectively produce an annular air conduit between the inside surface of the bore 46 and the tube 60. The lower bushing 58 is provided with a series of circumferentially spaced, upright slots 58a and with one or more horizontally extending, lower slots 58b, to permit that portion of the air conduit above the bushing 58 to communicate with the portion below such bushing 58. A short distance below the lower bushing 58 the bore 46 is enlarged and outwardly flared to present a wide, pressurized air discharge outlet 62 that remains in continuous open communication with the air supply passage 50, although such passage 50 is only intermittently communicated with a source of high pressure air as well understood by those skilled in the art.

In accordance with the present invention, the body 44 of the core 38 has a lowermost, generally cylindrical tip 64 which is of slightly reduced outside diameter relative to the inside diameter of the preform 20 in the area of its neck 34, as illustrated best in FIGS. 5 and 6. In one exemplary embodiment, the tip 64 may be undersized by approximately 0.020 inches relative to the inside diameter of the neck 34 so as to present an annular clearance region between the tip 64 and the neck 34 which is approximately 0.010 inches wide when the blow core 38 is in the blow position of FIGS. 1, 5, and 6. If desired, a slight bevel 68 may be provided at the lowermost circumferential edge of the tip 64.

In accordance with the present invention, the tip 64 of the core 38 is provided with expandable sealing means broadly denoted by the numeral 70 for sealing the clearance region 66 when the blow core 38 is in the blow position. Such sealing means 70 includes a shallow, groove-like gland 72 that completely encircles the tip 64 just above the bevel 68 thereof. The sealing means also includes a plurality of horizontally extending, circumferentially spaced passages 74 that communicate the gland 72 with the bore 46 in its enlarged area adjacent the tip 64. A third component of the sealing means 70 comprises an inherently resilient sealing element or ring 76 that encircles the tip 64 and is received within the gland 72.

The gland 72 is dove-tail shaped in cross-sectional configuration, as particularly illustrated in FIGS. 5 and 6, with an upright back wall 78, a radially outermost opening 80, and a pair of opposed, upper and lower sidewalls 82 that extend convergingly from the back wall 78 toward the opening 80. The passages 74 intersect the gland 72 at the back wall 78. As illustrated in FIG. 5, the elongated cylindrical body of the O-ring 76 has a cross-sectional diameter substantially corresponding to the depth of the gland 72 from the back wall 78 to the opening 80 such that the outermost periphery of the O-ring 76 is substantially flush with the adjacent surface of the core tip 64 when the O-ring 76 is in its contracted, uninflated position of FIG. 5. Preferably, the distance between the sidewalls 82 along the back wall 78 is slightly greater than the cross-sectional diameter of the O-ring 76, while the distance between the sidewalls 82 across the opening 80 is slightly less than the cross-sectional diameter of the O-ring 76. Consequently, not only is there a sealing contact made between the sidewalls 82 and the body of the O-ring when the latter is in its contracted position of FIG. 5, but also a greater amount of surface area of the O-ring is exposed to air pressure on the back side (radially inner) of the O-ring at this time than on the opening side thereof. This is important from the standpoint of causing the O-ring to expand into its FIG. 6 position when air pressure is applied to the bore 46, as will be described below.

Operation

As noted above, during the blow stage the blow core 38 moves down from its FIG. 2 position into the blow position of FIG. 1 in which the tip 64 is inserted a short distance into the open mouth of the preform 20. The stretch rod 40 is then quickly extended and a surge of high pressure air is discharged into the receptacle portion 42 of the preform to fully and completely stretch the warmed material into all of the recesses of the cavity 12. After the surge of air stops and the stretch rod 40 is retracted, the blow core 38 is withdrawn, the mold cavity halves 14 and 16 are separated along parting line 18, and the formed product is carried to a discharge station by the rotation plate 22.

Due to the clearance region 66 between the undersized tip 64 of the core 38 and the inside surface of the preform neck 34, the core 38 does not make contact with the preform during either insertion or removal of the core. However, once the tip 64 is fully inserted into the mouth of the preform, as illustrated in FIG. 5, the surge of high pressure air within the bore 46 reaches the backside of the O-ring 76 via the passages 74 and the gland 72 such that the O-ring 76 is caused to bulge radially outwardly into sealing engagement with the inside surface of the preform neck 34, as illustrated in FIG. 6. This effectively seals off the clearance region 66 and prevents the escape of high pressure air through this location. When the air surge is terminated, the O-ring 76 returns to its contracted condition of FIG. 5, disengaging itself from the neck of the preform and reestablishing the clearance 66. The core 38 may then be withdrawn without fear of contacting the preform.

It will be noted that during the surge of high pressure air into the open mouth of the preform 20 from the bore 46, the circular, transverse cross-section of the O-ring 76 experiences equal pressure on both its inside and outside surfaces. Its inside or back surfaces receive air pressure via the passages 74 and the interior portion of the gland 72, while the outside surface of the O-ring experiences air pressure from that air which moves up around the bevel 68 and through the clearance region 66 to reach the O-ring 76. However, although the pressure is the same on both sides of the O-ring, due to the dove tail configuration of the gland 72 there is greater surface area on the inside of the O-ring exposed to the air pressure than on the outside. Consequently, the additional force operating against the inside or back surface of the O-ring 76 is operable to expand it outwardly into its sealing engagement with the neck of the preform, as illustrated in FIG. 6.

It is also to be noted that in the present invention it is possible to maintain sealing engagement between the O-ring seal 76 and the neck of the preform even if there should happen to be a small amount of upward displacement of the blow core 38 during the air surge due to play in the frame member 24 or otherwise. In prior constructions, the tip of the mold core was typically tapered to facilitate insertion and removal. However, any slight upward movement caused, for example, by the extremely high air pressures involved would cause the tapered tip to disengage from the neck of the preform, creating an air escape path. On the other hand, in the present invention the sealing O-ring 76 is maintained yieldably against the neck of the preform regardless of the longitudinal position of the core 38 along the neck so that, even if some upward movement of the core takes place, the O-ring 76 will remain in sealing contact with the preform.

For purposes of example only, it is noted that the O-ring 76 may be constructed from a high temperature material such as VITON which is readily available to those in this industry from a number of sources of supply. It is also to be noted that although the drawings herein show the outside periphery of the O-ring 76 as being substantially flush with or slightly inside the gland 72, it is within the scope of the present invention to have such outside surface project slightly beyond and through the opening 80 during the time that the O-ring 76 is in its contracted condition of FIG. 5. It would still be desirable in such instance, however, for the total outside diameter of the O-ring 76 to be less than the inside diameter of the preform neck so that no contact would occur between the preform and the O-ring 76 during insertion and removal of the core 38.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In a blow core usable in making a blow-molded product from a preform, said preform having an annular neck that defines an open mouth into which a tip of the blow core is inserted, the improvement comprising:

expandable sealing means associated with said tip of the core for selectively sealing the mouth of the preform, said sealing means including an element disposed for expansion into sealing engagement with an interior surface of the neck after the core has been inserted into the preform whereby to seal the mouth, said element comprising a ring of resilient material extending in a circumferential direction around said tip of the core, said sealing means further including structure for supplying pressurized air to the ring in a direction for causing the ring to expand radially outwardly while the core is disposed within the mouth of the preform.

2. In a blow core as claimed in claim 1, said structure including an annular, radially outwardly opening gland receiving said ring and disposed to force the ring to bulge radially outwardly into an expanded condition when pressurized air is applied to the ring.

3. In a blow core as claimed in claim 2, said structure further including air passage means for supplying pressurized air to said gland at a location disposed radially inwardly of the ring, said gland being configured to cause the ring to sealingly engage interior surfaces of the gland during the time that said air passage means is supplying pressurized air to the gland whereby to seal the gland.

4. In a blow core as claimed in claim 3, said gland having a radially inwardly disposed back wall, a radially outwardly disposed opening, and a pair of opposed sidewalls extending between said back wall and the opening, said sidewalls converging toward one another as said opening is approached, said ring comprising a continuous elongated body formed into an annular configuration, said body having a transverse dimension exceeding the distance between said sidewalls across the opening.

5. A blow core as claimed in claim 4, said passage means including a plurality of circumferentially spaced ports in said back wall of the gland.

6. A blow core as claimed in claim 5, said blow core having an internal conduit through which pressurized air is supplied to the preform during the blow mold stage, said passage means communicating with said conduit.

7. In a machine having a blow station used in making a blow-molded product from a preform, said preform having a stretchable receptacle portion and an annular neck integral with said receptacle portion that defines an open entry mouth into the interior of the receptacle portion, the improvement comprising:

means for defining a blow cavity;

means for holding the preform by the outside of said neck while the receptacle portion projects into the blow cavity;

a blow core supported for reciprocal movement toward and away from a blow position in which a generally cylindrical tip of the blow core projects into the mouth of the preform, said tip being of slightly reduced diameter relative to the inside diameter of the neck of the preform whereby to present an annular clearance region between the core and the neck when the core is in said blow position;

a reciprocable stretch rod operably associated with said core for engaging the stretchable portion of the preform during blowing and stretching the preform deeper into the blow cavity;

means for directing pressurized, stretching air into the preform during the blow stage including an air discharge outlet at the tip of the core; and expandable sealing means at the tip of the core including an element disposed for expansion into sealing engagement with the interior surface of the neck of the preform while stretching air issues from said discharge outlet whereby to seal the clearance region against escape of stretching air.

8. In a machine as claimed in claim 7, said element comprising a ring of resilient material extending in a circumferential direction around said tip of the core, said sealing means further including structure for supplying pressurized air to the ring in a direction for causing the ring to expand radially outwardly while the core is disposed within the mouth of the preform.

9. In a machine as claimed in claim 8, said structure including an annular, radially outwardly opening gland receiving said ring and disposed to force the ring to bulge radially outwardly into an expanded condition when pressurized air is applied to the ring.

10. In a machine as claimed in claim 9, said structure further including air passage means for supplying pressurized air to said gland at a location disposed radially inwardly of the ring, said gland being configured to cause the ring to sealingly engage interior surfaces of the gland during the time that said air passage means is supplying pressurized air to the gland whereby to seal the gland.

11. In a machine as claimed in claim 10, said gland having a radially inwardly disposed back wall, a radially outwardly disposed opening, and a pair of opposed sidewalls extending between said back wall and the opening, said sidewalls converging toward one another as said opening is approached, said ring comprising a continuous elongated body formed into an annular configuration, said body having a transverse dimension exceeding the distance between said sidewalls across the opening.

12. In a machine as claimed in claim 11, said passage means including a plurality of circumferentially spaced ports in said back wall of the gland.

13. In a machine as claimed in claim 12, said means for supplying pressurized air including an internal conduit leading to said discharge outlet, said passage means communicating with said conduit.

14. In a blow core usable in making a blow-molded product from a preform, said preform having an annular neck that defines an open mouth into which a generally cylindrical tip of the core is inserted, the improvement comprising:

an annular gland around said tip of the core;

a ring of resilient material received within said gland; and means for supplying pressurized air to the gland in a direction to expand the ring to an outside diameter slightly larger than the outside diameter of the core tip.

15. In a blow core as claimed in claim 14, said gland being configured to cause the ring to sealingly engage interior surfaces of the gland during the time pressurized air is supplied to the gland.

16. In a blow core as claimed in claim 15, said gland having a radially inwardly disposed back wall, a radially outwardly disposed opening, and a pair of opposed sidewalls extending between said back wall and the opening, said sidewalls converging toward one another as said opening is approached, said ring comprising a continuous elongated body formed into an annular configuration, said body having a transverse dimension exceeding the distance between said sidewalls across the opening.

17. In a blow core as claimed in claim 16, said means for supplying pressurized air to the gland including a plurality of circumferentially spaced ports in the back wall of the gland.

18. In a blow core as claimed in claim 17, said means for supplying pressurized air to the gland further including an internal conduit within the core through which pressurized air is supplied to the preform during the blow stage, said ports in the gland communicating with said conduit.

19. In a blow core as claimed in claim 14, said means for supplying pressurized air to the gland including an internal conduit within the core through which pressurized air is supplied to the preform during the blow stage, said means for supplying pressurized air to the gland further including a plurality of circumferentially spaced ports in the gland communicating with said conduit.

* * * * *